United States Patent
Krebs et al.

(10) Patent No.: US 10,303,028 B2
(45) Date of Patent: May 28, 2019

(54) VEHICLE MIRROR HAVING INSCRIPTION

(71) Applicant: Magna Mirrors Holding GmbH, Sailauf (DE)

(72) Inventors: Peter Krebs, Moembris (DE); Andreas Vorndran, Grossheubach (DE)

(73) Assignee: Magna Mirrors Holding GmbH, Sailauf (DE)

( * ) Notice: Subject to any disclaimer, the term of this patent is extended or adjusted under 35 U.S.C. 154(b) by 0 days.

(21) Appl. No.: 15/708,605

(22) Filed: Sep. 19, 2017

(65) Prior Publication Data

US 2018/0081209 A1    Mar. 22, 2018

(30) Foreign Application Priority Data

Sep. 21, 2016 (DE) .................. 10 2016 218 084

(51) Int. Cl.
| | |
|---|---|
| *G02F 1/137* | (2006.01) |
| *B60R 1/06* | (2006.01) |
| *B60R 1/08* | (2006.01) |
| *G02F 1/1337* | (2006.01) |
| *G02F 1/1339* | (2006.01) |
| *G02F 1/1335* | (2006.01) |
| *G02F 1/1333* | (2006.01) |

(52) U.S. Cl.
CPC ............. *G02F 1/137* (2013.01); *B60R 1/06* (2013.01); *B60R 1/088* (2013.01); *G02F 1/1337* (2013.01); *G02F 1/1339* (2013.01); *G02F 1/13394* (2013.01); *G02F 1/133707* (2013.01); *G02F 1/1333* (2013.01); *G02F 1/133553* (2013.01); *G02F 2001/133374* (2013.01); *G02F 2001/133773* (2013.01); *G02F 2001/133776* (2013.01)

(58) Field of Classification Search
CPC ...................................................... G02F 1/137
See application file for complete search history.

(56) References Cited

U.S. PATENT DOCUMENTS

| | | | |
|---|---|---|---|
| 4,161,653 A | 7/1979 | Bedini et al. | |
| 4,201,451 A | 5/1980 | Jacob | |

(Continued)

FOREIGN PATENT DOCUMENTS

| | | | | |
|---|---|---|---|---|
| DE | 3421723 | * | 12/1984 | ............. G02F 1/133 |
| DE | 3421723 A1 | | 12/1984 | |

(Continued)

OTHER PUBLICATIONS

German Search Report dated Apr. 21, 2017 from corresponding German Patent Application No. DE 102016218084.3.

*Primary Examiner* — Sang V Nguyen
(74) *Attorney, Agent, or Firm* — Honigman LLP

(57) ABSTRACT

A vehicle mirror, in particular an (exterior) rear-view mirror, comprising a base layer made of glass, an adhesive layer on the glass, a first foil film, a first conductive layer, a first and a second alignment layer, a liquid crystal region, wherein spacers are provided in this region and the liquid crystal region is arranged between the first and second alignment layers, a conductive reflector layer, which is arranged on the side of the liquid crystal region opposite to the base layer, and a second foil film, wherein at least the first alignment layer is removed in a predetermined region, so that the crystals of the adjacent liquid crystal region are disordered.

19 Claims, 1 Drawing Sheet

(56) References Cited

U.S. PATENT DOCUMENTS

| | | | |
|---|---|---|---|
| 4,848,878 A | 7/1989 | Lee et al. | |
| 4,971,425 A | 11/1990 | Okabayashi et al. | |
| 5,841,496 A | 11/1998 | Itoh et al. | |
| 6,144,430 A | 11/2000 | Kuo | |
| 6,654,090 B1 * | 11/2003 | Kim | G02F 1/133753 349/106 |
| 6,690,268 B2 | 2/2004 | Schofield et al. | |
| 6,717,639 B2 | 4/2004 | Jung | |
| 6,784,956 B2 | 8/2004 | Matsumoto et al. | |
| 6,859,245 B2 | 2/2005 | Faris et al. | |
| 6,900,869 B1 * | 5/2005 | Lee | G02F 1/133707 349/129 |
| 7,184,190 B2 | 2/2007 | McCabe et al. | |
| 7,255,451 B2 | 8/2007 | McCabe et al. | |
| 7,274,501 B2 | 9/2007 | McCabe et al. | |
| 7,626,749 B2 | 12/2009 | Baur et al. | |
| 7,855,755 B2 | 12/2010 | Weller et al. | |
| 2004/0041770 A1 * | 3/2004 | Kubo | G02F 1/133707 345/96 |
| 2004/0165129 A1 * | 8/2004 | Okumura | G02F 1/133555 349/114 |
| 2005/0068482 A1 * | 3/2005 | Kume | G02F 1/133707 349/130 |
| 2005/0162589 A1 * | 7/2005 | Kume | G02F 1/133555 349/110 |
| 2005/0280754 A1 * | 12/2005 | Kume | G02F 1/133707 349/106 |
| 2011/0273659 A1 | 11/2011 | Sobecki | |
| 2014/0125932 A1 * | 5/2014 | Kawakami | G02F 1/133553 349/110 |
| 2015/0029432 A1 * | 1/2015 | Ishikawa | G02F 1/13394 349/43 |

FOREIGN PATENT DOCUMENTS

| | | | | |
|---|---|---|---|---|
| DE | 102013203531 | * | 5/2014 | G02F 1/13 |
| DE | 102013203531 B3 | * | 5/2014 | G02F 1/13 |
| JP | S6299724 | * | 5/1987 | G02F 1/13 |
| JP | S6299724 A | | 5/1987 | |
| JP | H11183927 A | | 7/1999 | |

* cited by examiner

VEHICLE MIRROR HAVING INSCRIPTION

CROSS REFERENCE TO RELATED APPLICATION

The present application claims priority of German patent application No. DE 102016218084.3, filed Sep. 21, 2016, which is hereby incorporated herein by reference in its entirety.

FIELD OF THE INVENTION

The invention relates to a vehicle mirror such as a rear-view mirror or external mirror having a transparent carrier, an adhesive layer, and a liquid crystal cell on which an inscription, a symbol, or a marking is to be recognizable in a predetermined region.

BACKGROUND OF THE INVENTION

Electrochromatic substances are used in conventional vehicle mirrors. Therein, the inscription is imprinted or produced by local removal of the front mirror coating. Liquid crystals have heretofore been used in displays in a vehicle. Inscriptions and markings are typically created therein by imprinting on the carrier. These imprints are clearly recognizable in daylight, however, when the mirror darkens due to increased light action, this recognizability suffers. A vehicle mirror having a liquid crystal cell is known, for example, from DE 10 2013 203 531 B3.

In the case of an LC cell which is embedded in the structure of a vehicle mirror, such a solution can only be applied to the carrier, however, but not to the cell itself, because it is soft and can be damaged upon imprinting. One solution for an LC cell can therefore also be the removal of the rearmost reflector layer. The light thus cannot be reflected on the reflector and is visible at the surface of the mirror. This would function at least for normal operation. However, this is problematic if there are also regions on the mirror which are to be illuminated. Since a light-emitting diode is attached behind the reflector layer for this purpose, the light of the LED then appears not only on the intended region, but rather scattered light can also illuminate the originally dark marking. However, this is an undesired optical effect, so that the removal of the reflector is not an optimum solution.

A liquid crystal display having a scale inscription is known from JP S62-99 724 A, which is continuously bright independently of an electrical voltage at the display electrodes. It is implemented by local absence of the alignment layers.

A method for removing alignment layers in liquid crystal cells is known from JP H11-183 927 A.

SUMMARY OF THE INVENTION

The present invention provides a vehicle mirror, on which characters, symbols, and markings are to be made clearly visible, but at the same time an unattractive appearance is to be avoided. This is achieved by a vehicle mirror having a transparent carrier, an adhesive layer, and a liquid crystal cell comprising a first foil film; a first and a second electrically conductive layer, wherein the second electrically conductive layer is a reflector layer; a first and a second alignment layer; a liquid crystal region, wherein spacers are arranged in this region and the liquid crystal region is arranged adjacent between the first and second alignment layers and the first and second electrically conductive layers; and a second foil film; characterized in that at least the first alignment layer is removed in a predetermined region, so that the crystals of the adjacent liquid crystal region are disordered.

A vehicle mirror according to the invention having a transparent carrier, an adhesive layer, and a liquid crystal cell comprises a first foil film, a first and a second electrically conductive layer, wherein the second electrically conductive layer is a reflector layer, a first and a second alignment layer, a liquid crystal region, wherein spacers are provided in this region and the liquid crystal region is arranged adjacent between the first and second alignment layers and between the first and second electrically conductive layers, and a second foil film, wherein at least the first alignment layer is removed in a predetermined region, so that the crystals of the adjacent liquid crystal region are disordered. The light is thus blocked more strongly in the disordered region and an inscription, a symbol, or a marking is visible on the surface of the cell without light of a light-emitting diode or lamp shining through the marking or the surface (or a carrier) of the mirror having to be imprinted in an additional work step. This applies both to a heads-up display, i.e., a display in which the liquid crystal cell is embodied as completely transparent, and also to a vehicle mirror, which uses such a liquid crystal cell and which has a reflector layer, which reflect the light, as the second electrically conductive layer.

The cell is fastened using an adhesive layer to a transparent carrier, which is preferably produced from glass or a plastic.

The first conductive layer is preferably also removed in the predetermined region. It is thus ensured that the crystals in this region also remain disordered when the conductive layer is energized and the inscription, the symbol, or the marking remains visible even when the mirror is darkened.

The first and second alignment layers, the first and second electrically conductive layers, and the liquid crystal region at the edge are preferably sealed at the edge. For this purpose, the alignment layers and the electrically conductive layers are removed, preferably using lasers, and then adhesively bonded using an adhesive. In particular, the seal protrudes into the liquid crystal region. The unclean edges at the alignment layers and the electrically conductive layers, which arise upon removal by lasers, are thus reliably covered, which protects the liquid crystal region from soiling.

The predetermined region is preferably removed by means of lasers. On the one hand, lasering is a precise and comparatively simple method for partially removing the layers, on the other hand, the layers are subjected to a lasering process for the sealing in any case, and an additional method step can then be saved.

DETAILED DESCRIPTION OF THE DRAWINGS

Figure 1:
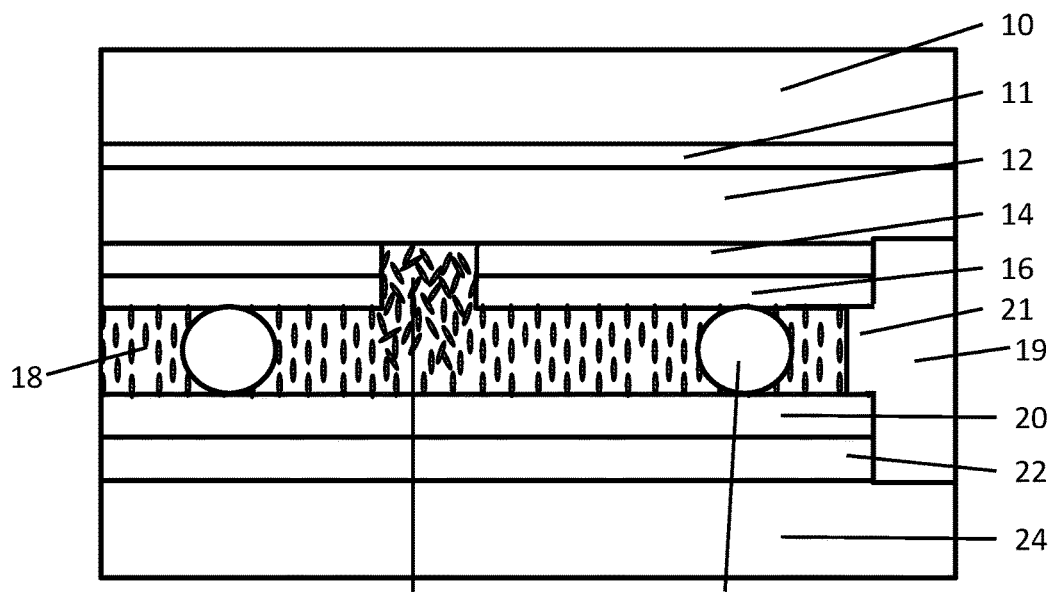
FIG. 1 shows a section through a mirror having a liquid crystal cell according to the invention, in which the crystals are aligned to be light-transmissive.
Figure 2:
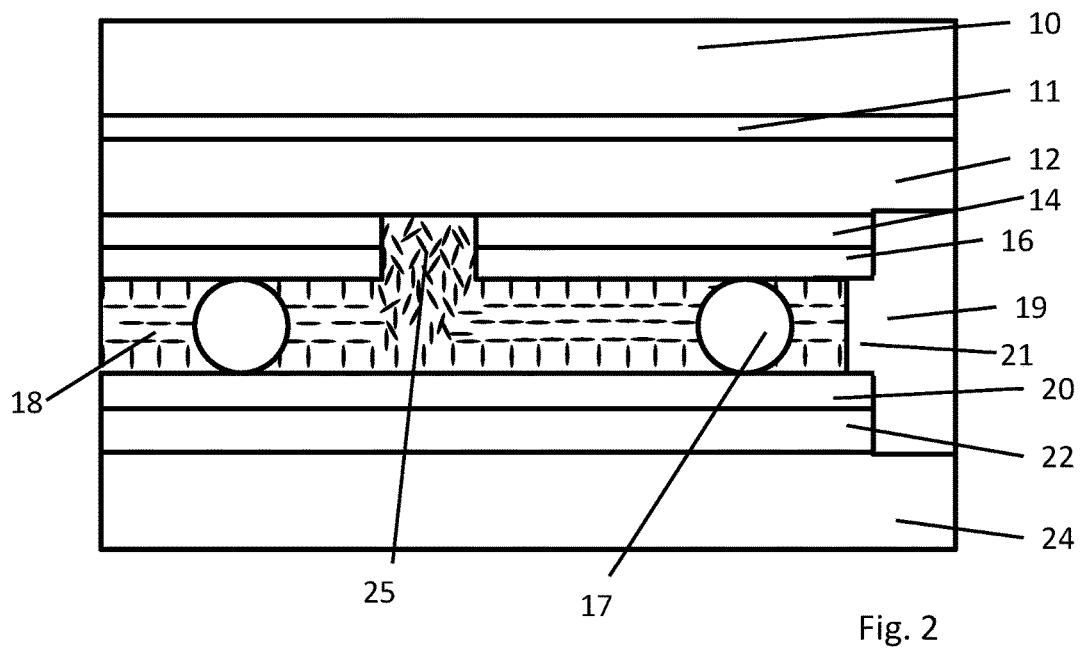
FIG. 2 shows a section through a mirror having a liquid crystal cell according to the invention, in which the crystals are aligned to block light.

When the terms "upper" and "lower" are used hereafter, reference is thereby made to the figures. In FIGS. 1 and 2, the side of the transparent carrier 10 is the side oriented toward the observer. A general structure is shown in the figures.

However, reference is made hereafter to a vehicle mirror, in particular an external mirror, by way of example.

The liquid crystal cell structurally consists of a first foil film (PET film) 12, to which a first electrically conductive layer 14 (conductive coating) is applied, to which an alignment layer 16 is in turn applied (alignment coating). The liquid crystal region 18 and a further alignment layer 20 then follow. A second electrically conductive layer 22 and a final foil film 24 adjoin this layer. In a transparent display such as a display screen provided in the windshield, all of these layers are made transparent, since the driver has to be able to see through them and the windshield and the cell cannot block the view of the road. In the design as a vehicle mirror, the second electrically conductive layer is a reflective layer, which reflects the incident light again. In a mirror, the second foil film 24 can also be made non-transparent.

The liquid crystal region 18 is between the two alignment layers 16, 20 and has spacers 17, which are preferably formed as spherical. The precise attitude of the spacer 17 is thus negligible, since the shape is always the same in all alignments. In principle, however, other shapes are also possible, for example, cuboids, polyhedrons, pins, or small projections, which can be provided on one or both alignment layers. The spacers ensure that the two alignment layers 16, 20 cannot unintentionally strike against one another. The alignment layers 16, 20 ensure that the crystals in the liquid crystal region 18 are aligned identically. For this purpose, the crystals "dock" on the alignment layer in the microscopic range and create crystal chains, wherein the connection between alignment layer and crystal is very strong and cannot be disengaged even by an electric field. The connection between two crystals is weaker, however, and can be disengaged by generating an electric field.

As described above, the individual layers are transparent except possibly for the second electrically conductive layer 22 and the second foil film 24. The transparency of the liquid crystal region 18 is dependent on the alignment of the crystals. The crystals are provided with color pigments, so that they block the light less strongly in a vertical alignment than in a horizontal alignment. A second electrically conductive layer designed as a reflector layer can be a silver layer, for example.

The production of the structure is performed using the conventional means, for example, by vapor deposition of the individual layers.

At the edge of the liquid crystal region 18, there is a seal 19, which ensures that the liquid crystal region 18 is held in the liquid crystal cell. The seal comprises the entire thickness of the liquid crystal region 18, preferably also the first and second alignment layers 16, 20 and the first and second conductive layers 14, 22. The first and second foil films 12, 24 can also be enclosed by the seal 19. To seal this region, the edge region of the alignment layers and the electrically conductive layers is removed by means of a laser. The sealing is then carried out using a corresponding adhesive and the region 19 is adhesively bonded. The edges of the removed layers may be soiled during the lasering. In order that this soiling does not have an effect in the liquid crystal region 18, the seal 19 preferably has a projection 21, which protrudes into the liquid crystal region 18 and covers the potentially soiled regions.

The functions of the liquid crystal cell will now be explained hereafter on the basis of a vehicle mirror, in particular an external mirror. For this purpose, the second electrically conductive layer 22 is referred to hereafter as the reflective layer 22. To be able to be installed in the mirror, the cell is fastened to a carrier 10. The carrier is transparent and can be produced from glass or also from a plastic. An adhesive layer 11 (OCA "Optical Clear Adhesive") is applied to the liquid crystal cell and it is then fastened to the carrier 10.

The alignment layers 16, 20 are used to align the liquid crystals so that the liquid crystal region 18 is light-transmissive, as shown in FIG. 1. All liquid crystals are aligned vertically from top to bottom therein. If stronger incident light is now present from the rear during the travel using a vehicle, for example, because a following vehicle turns up the headlights, control electronics (not shown) register this and apply a voltage to the first electrically conductive layer 14 and the conductive reflector layer 22, depending on parameters (for example, depending on the time of day, the normal incident light, etc.). At night, for example, the light reflected by the vehicle mirror can strongly impair the vision of the driver, if the incident light reflected in the mirror is excessively strong. If the electronics apply a voltage to the conductive layer and the conductive reflector layer, the liquid crystals, which are not arranged directly on the alignment layer, then disengage the connection thereof to one another and change the alignment thereof. As can be seen in FIG. 2, they are rotated from a vertical alignment into a horizontal alignment (switched liquid crystal). The color pigments provided on the crystals now block the incident light. This prevents the driver from being dazzled. However, since the light is not completely blocked but rather only "dimmed", the reflection can still be recognized in the mirror.

To now make an inscription, symbol, or marking visible on the mirror, at least the first alignment layer 16 is removed. The first conductive layer 14 is preferably also removed in the region in which the inscription, symbol, or marking is to result, so that the inscriptions are also to be seen at night, as described hereafter. Due to the removal of the alignment layer 16, a region 25 results, in which the liquid crystals are not aligned, but rather are arranged chaotically. In this region, in the normal case from FIG. 1, the light is blocked more strongly than in the liquid crystal regions 18, in which the crystals are aligned vertically. If light is now incident, the light is blocked more strongly in the chaotic region 25 than in the vertically aligned regions and accordingly also less light is reflected. This predetermined region is thus perceived as darker by the observer and an inscription or a marking can be recognized.

If the control electronics apply a voltage to the conductive layer 14 and the conductive reflector layer 22 and the liquid crystals are rotated to block/dim the light, the chaotic region 25 is more light-transmissive than the liquid crystal region 18 having rotated liquid crystals. The predetermined region is thus brighter than the surrounding region and can also be perceived by the observer.

The conductive reflector layer can possibly also be removed in the predetermined region, however, the foil film 24 should then be nontransparent, so that LEDs can be arranged behind the mirror structure, without these shining through the opening and illuminating the marking, which is visually undesirable. However, this would furthermore have the result that no light would be reflected in the predetermined region, which makes the recognizability at night impossible.

The removal of the layers can be carried out, for example, by etching or in a lithography method, however, lasering of the layers is preferred, since the sealing is already performed by lasers and this method step can therefore be carried out in an uncomplicated manner. In addition, multiple layers can also be removed simultaneously in an uncomplicated manner using the laser.

| List of reference signs | |
|---|---|
| carrier | 10 |
| adhesive layer | 11 |
| first foil film | 12 |
| first conductive layer | 14 |
| first alignment layer | 16 |
| seal | 19 |
| spacer | 17 |
| liquid crystal region | 18 |
| second alignment layer | 20 |
| projection | 21 |
| second electrically conductive layer | 22 |
| second foil film | 24 |
| predetermined region | 25 |

The invention claimed is:

1. A vehicle mirror having a transparent carrier, an adhesive layer, and a liquid crystal cell, the vehicle mirror comprising:
   a first foil film;
   a first electrically conductive layer and a second electrically conductive layer, wherein the second electrically conductive layer is a reflector layer;
   a first alignment layer and a second alignment layer;
   a liquid crystal region, wherein spacers are arranged in this region and the liquid crystal region is arranged adjacent between the first and second alignment layers and the first and second electrically conductive layers;
   a second foil film;
   wherein at least the first alignment layer is removed at a predetermined region, so that crystals of the adjacent liquid crystal region are disordered at the predetermined region; and
   wherein, when the first and second electrically conductive layers are unpowered, the crystals of the liquid crystal region between the first and second alignment layers are aligned so that the mirror is in an undimmed mode, and wherein, when the first and second electrically conductive layers are powered, the crystals of the liquid crystal region between the first and second alignment layers are not aligned so that the mirror is in a dimmed mode.

2. The vehicle mirror according to claim 1, wherein the first electrically conductive layer is also removed in the predetermined region.

3. The vehicle mirror according to claim 1, wherein at least the first and second alignment layers, the first and second electrically conductive layers, and the liquid crystal region are sealed at an edge via a seal.

4. The vehicle mirror according to claim 3, wherein the seal protrudes into the liquid crystal region.

5. The vehicle mirror according to claim 1, wherein the first alignment layer at the predetermined region is removed by a laser.

6. The vehicle mirror according to claim 1, wherein, when viewed by a person viewing the mirror, the predetermined region is darker than the rest of the liquid crystal region when the first and second electrically conductive layers are electrically powered.

7. The vehicle mirror according to claim 1, wherein, when viewed by a person viewing the mirror, the predetermined region is lighter than the rest of the liquid crystal region when the first and second electrically conductive layers are not electrically powered.

8. The vehicle mirror according to claim 1, wherein the predetermined region comprises one of an inscription, a symbol, or a marking.

9. A vehicle mirror, the vehicle mirror comprising:
   a transparent carrier and a liquid crystal cell attached at the transparent carrier;
   wherein the liquid crystal cell comprises a first foil film adjacent the transparent carrier;
   wherein the liquid crystal cell comprises a first electrically conductive layer and a second electrically conductive layer, and wherein the second electrically conductive layer comprises a reflector layer;
   wherein the liquid crystal cell comprises a first alignment layer and a second alignment layer;
   wherein the liquid crystal cell comprises a liquid crystal region comprising a plurality of crystals;
   wherein the liquid crystal cell is disposed between and contacts the first and second alignment layers;
   wherein the first and second alignment layers are disposed between the liquid crystal cell and the first and second electrically conductive layers, respectively;
   wherein the liquid crystal cell comprises a second foil film at the second electrically conductive layer;
   wherein, when the first and second electrically conductive layers are not electrically powered, the crystals of the liquid crystal region between the first and second alignment layers are aligned so that the mirror is in an undimmed mode, and wherein, when the first and second electrically conductive layers are electrically powered, the crystals of the liquid crystal region between the first and second alignment layers are not aligned so that the mirror is in a dimmed mode; and
   wherein the first alignment layer is removed in a predetermined region, so that the crystals of the adjacent liquid crystal region are disordered at the predetermined region.

10. The vehicle mirror according to claim 9, comprising a plurality of spacers disposed between said first and second alignment layers.

11. The vehicle mirror according to claim 9, wherein the first electrically conductive layer is also removed in the predetermined region.

12. The vehicle mirror according to claim 9, wherein at least the first and second alignment layers, the first and second electrically conductive layers, and the liquid crystal region are sealed at an edge via a seal.

13. The vehicle mirror according to claim 9, wherein, when viewed by a person viewing the mirror, the predetermined region is darker than the rest of the liquid crystal region when the first and second electrically conductive layers are electrically powered.

14. The vehicle mirror according to claim 9, wherein, when viewed by a person viewing the mirror, the predetermined region is lighter than the rest of the liquid crystal region when the first and second electrically conductive layers are not electrically powered.

15. The vehicle mirror according to claim 9, wherein the predetermined region comprises one of an inscription, a symbol, or a marking.

16. A vehicle mirror, the vehicle mirror comprising:
   a transparent carrier and a liquid crystal cell attached at the transparent carrier;
   wherein the liquid crystal cell comprises a first foil film adjacent the transparent carrier;

wherein the liquid crystal cell comprises a first electrically conductive layer and a second electrically conductive layer, and wherein the second electrically conductive layer comprises a reflector layer;

wherein the liquid crystal cell comprises a first alignment layer and a second alignment layer;

wherein the liquid crystal cell comprises a liquid crystal region comprising a plurality of crystals;

wherein the liquid crystal cell is disposed between and contacts the first and second alignment layers;

wherein the first and second alignment layers are disposed between the liquid crystal cell and the first and second electrically conductive layers, respectively;

wherein the liquid crystal cell comprises a second foil film at the second electrically conductive layer;

wherein, when the first and second electrically conductive layers are not electrically powered, the crystals of the liquid crystal region between the first and second alignment layers are aligned so that the mirror is in an undimmed mode, and wherein, when the first and second electrically conductive layers are electrically powered, the crystals of the liquid crystal region between the first and second alignment layers are not aligned so that the mirror is in a dimmed mode;

wherein the first alignment layer is removed in a predetermined region, so that the crystals of the adjacent liquid crystal region are disordered at the predetermined region;

wherein, when viewed by a person viewing the mirror, the predetermined region is darker than the rest of the liquid crystal region when the first and second electrically conductive layers are electrically powered;

wherein, when viewed by a person viewing the mirror, the predetermined region is lighter than the rest of the liquid crystal region when the first and second electrically conductive layers are not electrically powered; and wherein the predetermined region comprises one of an inscription, a symbol, or a marking.

17. The vehicle mirror according to claim 16, comprising a plurality of spacers disposed between said first and second alignment layers.

18. The vehicle mirror according to claim 16, wherein the first electrically conductive layer is also removed in the predetermined region.

19. The vehicle mirror according to claim 16, wherein at least the first and second alignment layers, the first and second electrically conductive layers, and the liquid crystal region are sealed at an edge via a seal.

* * * * *